US008052775B2

(12) United States Patent
Hou et al.

(10) Patent No.: US 8,052,775 B2
(45) Date of Patent: Nov. 8, 2011

(54) PROCESS FOR THE PREPARATION OF A TWO-LAYER METAL PALLADIUM OR PALLADIUM ALLOY COMPOSITE MEMBRANE

(75) Inventors: Shoufu Hou, Dailan (CN); Kui Jiang, Dalian (CN); Wenzhao Li, Dalian (CN); Hengyong Xu, Dalian (CN); Lixiang Yuan, Dalian (CN)

(73) Assignees: BP P.L.C., London (GB); Dalian Institute of Chemical Physics, Dalian (CN)

( * ) Notice: Subject to any disclaimer, the term of this patent is extended or adjusted under 35 U.S.C. 154(b) by 944 days.

(21) Appl. No.: 10/585,516

(22) PCT Filed: Jan. 7, 2005

(86) PCT No.: PCT/GB2005/000041
§ 371 (c)(1),
(2), (4) Date: Jul. 10, 2006

(87) PCT Pub. No.: WO2005/065806
PCT Pub. Date: Jul. 21, 2005

(65) Prior Publication Data
US 2009/0130477 A1 May 21, 2009

(30) Foreign Application Priority Data
Jan. 9, 2004 (CN) .......................... 2004 1 0021025

(51) Int. Cl.
*B01D 53/22* (2006.01)
(52) U.S. Cl. .... 95/43; 95/55; 96/11; 264/44; 423/328.1; 502/333; 502/339

(58) Field of Classification Search .................. 502/333, 502/339; 423/328.1; 96/11; 95/55, 43; 264/44
See application file for complete search history.

(56) References Cited

U.S. PATENT DOCUMENTS 3,353,982 A * 11/1967 Blaha ........................... 427/229
3,458,409 A * 7/1969 Yamamoto et al. ........... 205/257
(Continued)

FOREIGN PATENT DOCUMENTS
EP     1 180 392 A1     2/2002
(Continued)

OTHER PUBLICATIONS
Webster's Third New International Dictionary, p. 315, 1981.*
(Continued)

*Primary Examiner* — Jason M Greene
*Assistant Examiner* — Anthony Shumate
(74) *Attorney, Agent, or Firm* — Nixon & Vanderhye

(57) ABSTRACT

Process for preparing a two layer metal palladium or palladium alloy composite membrane consisting of a porous substrate support and a palladium or palladium alloy membrane by rinsing/washing and drying the porous substrate support, treating the porous substrate support with a pore filler in order to decorate the pores of the support and the disfigurements of the substrate surface, sensitizing and activating with a palladium solution the decorated substrate support, and plating the resulting support with a palladium solution to form the two layer composite membrane, drying. The resulting composite membrane is subjected to a post-processing where the pore fillers residing in the pore-channels of the porous substrate are partly removed or reduced in volume through heating.

18 Claims, 1 Drawing Sheet

Porous Al$_2$O$_3$ support     Filler inside the channels of support     Palladium nuclei formation Palladium membrane formation     Filler removal or partly removal

U.S. PATENT DOCUMENTS

| | | | | |
|---|---|---|---|---|
| 3,607,787 | A | * | 9/1971 | Jung et al. .................. 502/331 |
| 3,689,611 | A | * | 9/1972 | Hardy et al. ................. 264/602 |
| 3,918,927 | A | * | 11/1975 | Wells .......................... 428/607 |
| 4,865,630 | A | * | 9/1989 | Abe ................................ 96/11 |
| 6,066,592 | A | * | 5/2000 | Kawae et al. ................ 502/439 |
| 6,180,559 | B1 | * | 1/2001 | Roberts et al. .............. 502/326 |
| 6,228,800 | B1 | * | 5/2001 | Yamaguchi et al. ......... 502/339 |
| 6,398,926 | B1 | * | 6/2002 | Mahneke .................. 204/224 R |
| 6,649,559 | B2 | * | 11/2003 | Drost et al. .................. 502/182 |
| 2003/0035943 | A1 | * | 2/2003 | Jones et al. ................ 428/317.9 |
| 2003/0183080 | A1 | * | 10/2003 | Mundschau .................... 95/55 |

FOREIGN PATENT DOCUMENTS

| | | |
|---|---|---|
| EP | 1 342 500 A1 | 9/2003 |
| EP | 1 362 630 A1 | 11/2003 |
| JP | 63-105977 | 5/1988 |
| JP | 01-131004 | 5/1989 |
| JP | 04-349926 | 12/1992 |
| JP | 2955062 B2 * | 10/1999 |
| JP | 2002-052326 | 2/2002 |
| JP | 2003-190748 | 7/2003 |
| JP | 2004-000911 | 1/2004 |

OTHER PUBLICATIONS

Patent Abstracts of Japan, vol. 017, No. 205; Apr. 22, 1993 & JP 04 349926 A (Mitsubishi Heavy Ind. Ltd.) Dec. 4, 1992 (Abstract).

Patent Abstracts of Japan, vol. 1998, No. 06; Apr. 30, 1998 & JP 10 028850 A (Toyota Motor Corp.; Toyoda Gosei co. Ltd.) Feb. 3, 1998 (Abstract).

Uemiya, S., et al; "Hydrogen permeable palladium-silver alloy membrane supported on porous ceramics"; *Journal of Membrane Science,* vol. 56, pp. 315-325 (1991).

*Hawley's Condensed Chemical Dictionary;* Eleventh Edition, Revised by N. Irving Sax, et al, 4 pgs (1987).

Extract from Office Action issued in corresponding Chinese Application No, 200580007843.3, dated Jun. 3, 2011 (1 pg).

Extract from Office Action issued in corresponding European Application No. 05 701 811.1, dated Mar. 7, 2009 (1 pg).

* cited by examiner

PROCESS FOR THE PREPARATION OF A TWO-LAYER METAL PALLADIUM OR PALLADIUM ALLOY COMPOSITE MEMBRANE

This application is the U.S. National Phase of International Application PCT/GB2005/000041, filed 7 Jan. 2005, which designated the U.S. PCT/GB2005/000041 claims priority to Chinese Application No. 200410021025.6 filed 9 Jan. 2004. The entire content of these applications are incorporated herein by reference.

BACKGROUND OF THE INVENTION

The present invention relates to a metal palladium—or alloy palladium—composite membrane which exhibits a high permeable hydrogen flux and high hydrogen selectivity for separation or purification. The present invention further relates to a preparation method for producing these said metal or alloy palladium composite membranes.

The increased demand for hydrogen in recent years in many sectors such as petroleum refining, petrochemical and semi-conductor processing and in new energy-related applications such as clean fuel for fuel cells and vehicles has led to a high interest in methods for separation and purification of hydrogen from gas mixtures. Palladium membranes or alloy palladium membranes have been the subject of many studies, due largely to their unmatched potential as hydrogen selective membranes for separation or purification and membrane reactors for hydrogenation/dehydrogenation reactions. However, these studies show that improvement regarding hydrogen permeability in pure and composite membranes is necessary, as the measured hydrogen permeation flux throughout the studies remained very low.

Another significant problem found in membrane studies is, under 275° C., pure palladium membrane is susceptible to cracking during the phase transformation due to the amount of hydrogen absorbed. This phenomenon is often termed 'hydrogen embrittlement'. It is known however that hydrogen embrittlement can be dramatically reduced, even at room temperature, by the formation of an alloy palladium membrane such as Pd—Ag alloy membrane, Pd—Cu alloy membrane or Pd—Au alloy membrane.

Membranes can either exist as a pure or as a composite membrane. A pure palladium membrane, that is an unsupported palladium membrane, is well known in the public domain. The corresponding thickness of the membrane must be greater than 200 microns in order to ensure enough mechanical strength to sustain the reaction; consequently this specified membrane thickness results in a low hydrogen permeable flux and a very high production cost. Therefore composite membranes are preferred, that is a supported palladium membrane where the palladium membrane layer is connected to a porous substrate support, hence reducing the required thickness of the palladium membrane layer and consequently reducing the expense and improving the hydrogen permeation flux, whilst still maintaining the mechanical strength of the whole membrane.

As shown in the prior art, conventional composite membranes exist in three defined layers; palladium/palladium alloy membrane layer, the surface substrate support and an intermediate layer interconnecting the previous two layers. Indeed, in order to obtain a thin palladium/palladium alloy membrane layer on porous substrates, an intermediate layer is usually introduced in the prior art, which results in a three-layer composite membrane. However this three layer formation again presents the major problem of a low hydrogen permeation flux.

SUMMARY OF THE INVENTION

The present invention concentrates on the aforementioned problems, of the low hydrogen permeable flux and high production costs and proposes a technique for forming a palladium composite membrane directly onto the surface of a porous substrate support without use of an intermediate layer between the membrane and the support. This technique will create a two layer composite membrane as opposed to the conventional three layer composite membrane.

The present invention concentrates on a simple and easy to operate method to modify the porous substrate by preoccupying the pore channels or disfigurements of the substrate surface. Then it becomes possible to produce a thin dense palladium membrane using an electroless plating preparation method.

The known preparation method for the conventional three layer palladium/palladium alloy composite membrane comprises of a method wherein the porous substrate support is first subjected to 'Surface decoration' in order to overcome the problems associated with the existence of large pores and disfigurement at the surface. These said defects arise due to the non-homogeneous nature of both the surface and of the pore distribution of the support and as a result make it difficult to form a dense palladium membrane on the surface of the support which consequently reduces the membranes' permeable hydrogen selectivity. Surface decoration is used to avoid the existence of the large pores and defects and can be performed by either:

a) Using a porous surface modifier such as $\gamma$-$Al_2O_3$, to coat a thin layer over the substrate surface through coating or moulding in order to produce an intermediate layer.

b) Using a porous material, which has a smaller pore-diameter than the pore channels of the substrate support, such as $\gamma$-$Al_2O_3$, $ZrO_2$, $SiO_2$ or $CeO_2$ to fill in the large pore channels or disfigurements of the substrate surface.

There are however some serious problems associated with these two conventional 'surface decoration' methods. For the first 'surface decoration' method mentioned above, porous materials such as $\gamma$-$Al_2O_3$ were used to coat a thin intermediate layer over the channels of substrate surface through coating or moulding. Unfortunately upon membrane formation the palladium plating solution enters into the pore channels, resulting in palladium deposition in the channels of the substrate, thus effectively causing a second resistance to hydrogen permeation and lowering the hydrogen permeation flux.

In the second decoration method, porous materials, which have a smaller pore-diameter than the pore channels of the substrate support, such as $\gamma$-$Al_2O_3$, $ZrO_2$, $SiO_2$ or $CeO_2$ are used to fill in the large pore channels or disfigurements of the substrate surface before electroless plating. This method presents problems for the same reason as the first method. The electroless plating solution inevitably enters into the pore channels of the chosen substrate. Thus, the porous materials filled in the substrate pore channels will again form a second resistance to hydrogen permeation and thus the hydrogen permeation flux is again considerably low.

Therefore the objective of this present invention is to provide a new efficient surface decoration method of the porous substrate support, for preparation of a two layer palladium or palladium alloy composite membrane that exhibits a high hydrogen permeable flux.

To achieve the above objective, the present invention is essentially a two layer metal palladium composite membrane consisting of a porous substrate support and a palladium membrane. The metal palladium composite membrane is characterized in that the palladium metal substantially exists on the outer surface of the porous substrate support with little or no presence in the pore channels of the substrate.

This invention also includes a two layer palladium alloy composite membrane, consisting of a porous substrate support and a palladium alloy membrane. The palladium alloy composite membrane is characterized in that the palladium alloy membrane substantially exists on the outer surface of the porous substrate support with little or no presence in the pore channels of the substrate.

According to the preparation procedure of present invention there is 'little or no presence' of palladium in the pore channels of the support because our pore filler preoccupies the pore channels of porous substrate which prevents the palladium plating solution from entering the substrate.

According to a preferred embodiment of the present invention, 'little or no presence' of palladium in the pore channels of the support is defined as the porous substrate support containing less than 5% of the total palladium weight present in the whole of the composite membrane and in particular less than 2% of the total palladium weight present in the whole of the composite membrane.

The present invention relates to both of these aforementioned two layer composite membranes which are both obtainable by the following preparation process. According to a preferred embodiment of the present invention the process proceeds by the following consecutive steps;

1. The porous substrate support is rinsed with a dilute solution of hydrochloric acid, washed, rinsed with a dilute solution of sodium hydroxide, and then washed with distilled water, rinsed with a solvent like $CCl_4$, and dried under ambient conditions.
2. The porous substrate support prepared as above is then immersed in a solution of pore filler under vacuum conditions for 20 min. The excess pore filler residing on the substrate surface is preferably removed by mechanical cleaning e.g. wiping the substrate surface, and then washed with distilled water. According to a preferred embodiment of the present invention this method of decoration is repeated 5~6 times.
3. After surface decoration the porous substrate support is sensitized in $SnCl_2$ solution and activated in $PdCl_2$ solution, respectively. According to a preferred embodiment of the invention this process is repeated 4 times. The $Pd^0$ atoms, formed in the reduction of $Pd^{2+}$ by $Sn^{2+}$ adsorb over the substrate surface and form nuclei for further Pd growth.
4. The porous substrate is then immersed in a chemical plating solution (electroless plating) with a typical composition of $[Pd(NH_3)_2]Cl_2$ (4 g/l), EDTA 2Na (65 g/l), $NH_2$—$NH_2.H_2O$ (0.6 g/l), $NH_3.H_2O$ (28%) (300 ml/l), pH=~10, 50° C. In the formation of $Pd^0$, $Pd^{2+}$ existed in the chemical plating solution as metastable metal complex ion continuously being reduced to $Pd^0$ by reducing agent hydrazine. Pd nuclei gradually become large to form the dense palladium membrane.
5. The porous substrate is then subjected to post-processing where the pore fillers residing in the pore-channels of the porous substrate are removed or reduced in volume through either heating or physical/chemical dissolving.

The Pd membrane is then dried at 200° C. in nitrogen for 60 min, and then calcined at 500° C. for 120 min.

Figure 1:
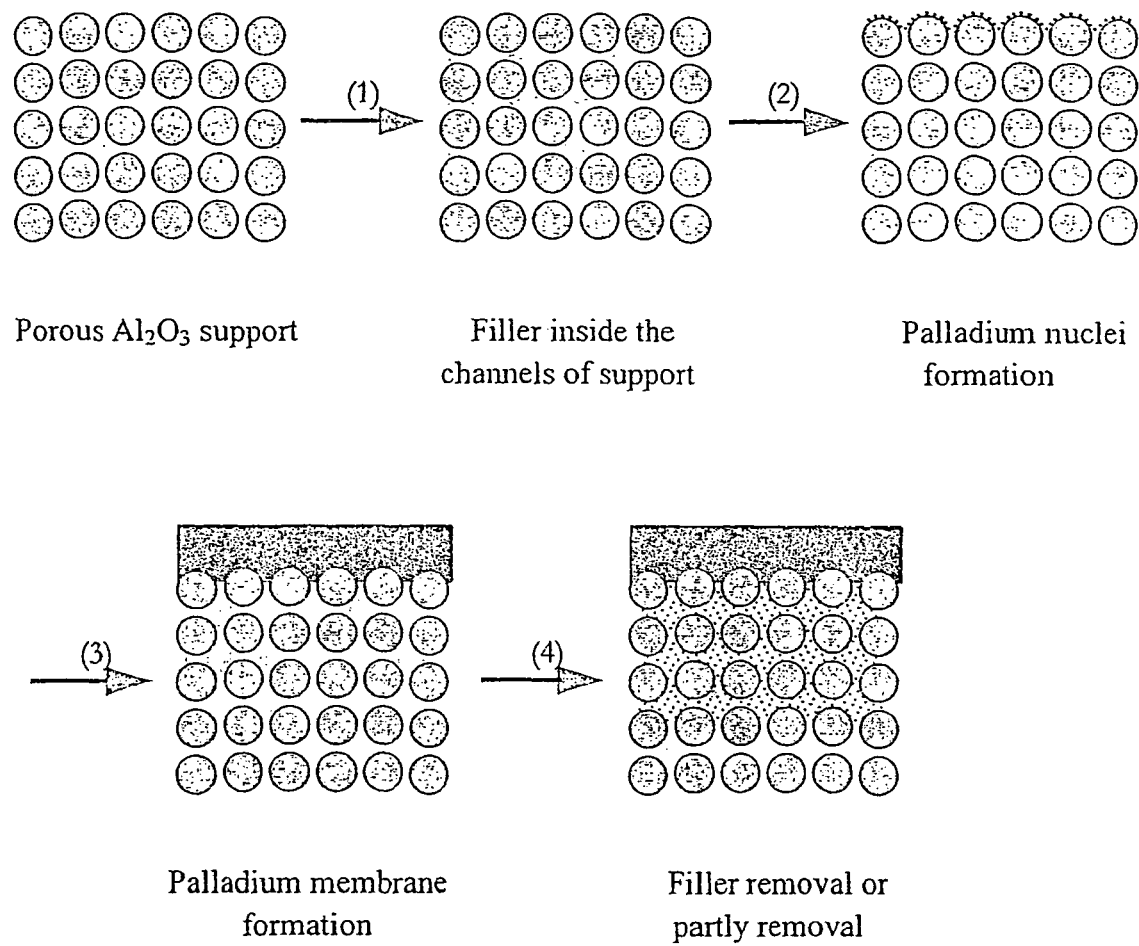
FIG. 1 represents a schematic description of the preparation steps procedure and of the resulting membrane. The four corresponding preparation steps are as follows.

DETAILED DESCRIPTION OF THE INVENTION (1) Substrate modification—The modification of porous support involves preoccupying the channels of the porous substrate by pore fillers, for example $Al(OH)_3$, which can be removed or partly removed by post-processing.
(2) Palladium nuclei formation—Palladium nuclei will be formed by the sensitization and activation technique.
(3) Membrane formation—Palladium or palladium alloy membrane are formed by electroless plating method.
(4) Modifier decomposition—The pore fillers, for example $Al(OH)_3$ are decomposed to porous $Al_2O_3$ which will keep the channels of the substrate open, which form free passages for $H_2$ permeation.

As indicated hereabove, the pore fillers are substances that are capable of preoccupying the channels of the porous substrate and optionally the disfigurements of the substrate surface during the decoration technique step, and prevent palladium ingress inside the pores during the preparation.

Preferably, the said pore fillers are then removed or partly removed by post-processing, e.g. heat treatment (preferably pyrolysis) and/or physical dissolution.

The said pore fillers can preferably be gels sols, colloids or precipitates.

They are preferably chosen amongst Al-sol, Si-sol, Ti-sol, Zr-sol and/or Ce-sol. They can also be preferably chosen amongst hydroxide-colloid, alkali carbonate colloid and/or carbonate colloid.

They can also be preferably chosen amongst hydroxide-precipitates, alkali carbonate precipitates and/or carbonate precipitates.

Most preferably, the pore fillers used according to the present invention are characterised by a particle size lower than 0.2 micron, preferably lower than 0.1 micron, most preferably lower than 0.05 micron.

In the technique scenario of this invention, the chemical particles which could be processed (such as pyrolysis) to porous tiny particles as pore fillers, or which could evidently shrink its volume by pyrolysis process such as gel, sol, colloid, precipitate (Al-sol, Si-sol, Ti-sol, hydroxide colloid, alkali carbonate colloid, carbonate precipitate, et al.), are considered as pore filler. Under the vacuum conditions, porous substrate membrane was suspended in the sol, colloid, or precipitates solution of said pore fillers, the tiny particles of pore fillers entered the pore channel of porous substrate, especially the big channel or the disfigurement, such will decorate the substrate surface and will benefit the formation of dense palladium membrane. Due to the pyrolysis process after palladium membrane formation made the pore fillers shrink its volume and decomposed to porous materials, which provide the free passages for hydrogen permeating the membrane, metal palladium composite membrane derived from modified porous substrate will have high hydrogen permeable flux.

According to a preferred embodiment of the invention the material used for the porous substrate support of the metal palladium composite membrane or alloy palladium composite membrane is selected from one of the following porous materials; porous stainless steel, porous nickel, porous glass or porous ceramics. According to a preferred embodiment of the invention the preferred materials used for the support are porous stainless steel and porous ceramics.

The characteristics of the present invention are as follows;
i. Simple technology. In this invention, vacuum is the only condition needed for pore filler particles entering the pore channels of porous substrate. Both the operation and technology are very simple.
ii. Wide application. This invention is not limited to the substrate membrane decoration for metal palladium/palladium alloy composite membrane preparation; it can also be applied for the decoration of any porous substrates for other metal membranes. However, the pore fillers are those which do not react with the plating solution.
iii. Low production cost. In this invention, cheap pore fillers, which could be decomposed by pyrolysis, are used such as sol, colloid, or precipitate. The raw materials used are inexpensive, the preparation technology is simple, and easy to perform, therefore the production cost of the process is low.

EXAMPLES

The details of this invention will be described in the following examples. In the following examples, hydrogen permeable flux and permeable selectivity are measured at 500° C.

Example 1

Colloid preparation: the solution of aluminium nitrate and the solution of sodium carbonate are simultaneously dropped in one beaker at 55° C., pH=8 to obtain an alkali alumina carbonate colloid. The colloid was washed 6 times with distilled water. If the above solution of sodium carbonate is replaced by the solution of potassium carbonate, ammonia, sodium hydroxide and/or potassium hydroxide as precipitator, the corresponding colloid or precipitates will be obtained.

Porous substrate surface decoration: substrate is alumina porous ceramic tube. Porous substrate was first rinsed with the dilute solution of hydrochloric acid and the dilute solution of sodium hydroxide, and then washed with distilled water, rinsed with $CCl_4$, and then dried. The rinsed alumina porous ceramic tube were immerged in the above colloid solution at vacuum condition, colloid particles will enter the pore channels and the surface disfigurements of alumina porous ceramic tube. The excess surface pore filler residing on the surface of the support was then removed by mechanical cleaning.

Palladium composite membrane preparation: Porous substrates after decoration were sensitized in $SnCl_2$ solution and activated in $PdCl_2$ solution, respectively. The above steps were repeatedly 4 times. $Pd^0$ atoms, formed in the reduction of $Pd^{2+}$ by $Sn^{2+}$ adsorbed over the substrate surface.

Immerging the porous substrate into the electroless plating solution, whose typical composition is $[Pd(NH_3)_2]Cl_2$ (4 g/l), EDTA.2Na (65 g/l), $NH_2$—$NH_2.H_2O$ (0.6 g/l), $NH_3.H_2O$ (28%) (300 ml/l), pH=10, 50° C. In the catalysis of Pd nuclei, $Pd^{2+}$ existed in the electroless plating solution as metastable metal complex ion continuously being reduced to $Pd^0$ by reducing agent hydrazine. $Pd^0$ gradually became large enough to form a dense palladium membrane.

Post processing: The palladium composite membrane was then subjected to drying at 200° C. and calcining at 500° C. in order to decompose the pore fillers of alkali alumina carbonate colloid which resides in the pore-channels of the porous substrate.

Table 1 gives the hydrogen permeable performances of palladium composite membrane prepared with $Al(NO_3)_3$ and different precipitators which modified the porous alumina ceramic tube.

TABLE 1

Hydrogen permeable performances of metal palladium composite membranes

| Precipitator | Hydrogen flux $m^3 \cdot m^{-2} \cdot h^{-1} \cdot bar^{-1}$ | Hydrogen selectivity $H_2/N_2$ |
|---|---|---|
| $Na_2CO_3$ | 74 | 8800 |
| $K_2CO_3$ | 69 | 5800 |
| $NH_3 \cdot H_2O$ | 67 | 7200 |
| NaOH | 56 | 4200 |
| KOH | 70 | 5900 |

Example 2

Colloid preparation: it is the same as that in example 1.

Porous substrate surface decoration: substrate is porous stainless steel tube. Decoration method is the same as that in example 1. Post processing method is the same as that in example 1.

Table 2 gives the hydrogen permeable performances of palladium composite membrane prepared with $Al(NO_3)_3$ and different precipitators which modified the porous stainless steel tube.

TABLE 2

Hydrogen permeable performances of metal palladium composite membranes

| Precipitator | Hydrogen flux $m^3 \cdot m^{-2} \cdot h^{-1} \cdot bar^{-1}$ | Hydrogen selectivity $H_2/N_2$ |
|---|---|---|
| $Na_2CO_3$ | 38 | 4400 |
| $K_2CO_3$ | 34 | 5100 |
| $NH_3 \cdot H_2O$ | 29 | 3500 |
| NaOH | 33 | 3900 |
| KOH | 34 | 4100 |

Example 3

Colloid preparation: the solution of cerium nitrate and the solution of sodium carbonate are simultaneously dropped in one beaker at 55° C., PH=9 to obtain an alkali cerium carbonate colloid. The colloid was washed 5 times with distilled water. If the above solution of sodium carbonate is replaced by the solution of potassium carbonate, ammonia, sodium hydroxide and/or potassium hydroxide as precipitator, the corresponding colloid or precipitates will be obtained.

Porous substrate surface decoration: substrate is alumina porous ceramic tube. Porous substrate was first rinsed with the dilute solution of hydrochloric acid and the dilute solution of sodium hydroxide, and then washed with distilled water, rinsed with $CCl_4$, and then dried. The rinsed alumina porous ceramic tube were immerged in the above colloid solution at vacuum condition, colloid particles will enter the pore channel channels and the surface disfigurements of alumina porous ceramic tube. The excess surface pore filler residing on the surface of the support was then removed by mechanical cleaning.

Palladium composite membrane preparation: the procedures are the same as those in example 1.

Post processing method is the same as that in example 1.

Table 3 gives the hydrogen permeable performances of palladium composite membrane prepared with $Ce(NO_3)_3$ and different precipitators which modified the porous alumina ceramic tube.

TABLE 3

Hydrogen permeable performances of metal palladium composite membranes

| Precipitator | Hydrogen flux $m^3 \cdot m^{-2} \cdot h^{-1} \cdot bar^{-1}$ | Hydrogen selectivity $H_2/N_2$ |
|---|---|---|
| $Na_2CO_3$ | 72 | 7600 |
| $K_2CO_3$ | 70 | 4800 |
| $NH_3 \cdot H_2O$ | 69 | 6200 |
| NaOH | 62 | 3100 |
| KOH | 56 | 4100 |

Example 4

Colloid preparation: $CO_2$ is injected into the $Ca(OH)_2$ solution to form $CaCO_3$ precipitate, which were rinsed 5 times with distilled water.

Porous substrate surface decoration: substrate is alumina porous ceramic tube. Porous substrate was first rinsed with the dilute solution of hydrochloric acid and the dilute solution of sodium hydroxide, and then washed with distilled water, rinsed with $CCl_4$, and then dried. The rinsed alumina porous ceramic tube were immerged in the above $CaCO_3$ precipitate suspending liquid at vacuum condition, $CaCO_3$ precipitate particles will enter the pore channels and the surface disfigurements of alumina porous ceramic tube. The excess surface pore filler residing on the surface of the support was then removed by mechanical cleaning.

Palladium composite membrane preparation: the procedures are the same as those in example 1.

Post processing method is the same as that in example 1.

Palladium composite membrane, prepared by chemical plating method and porous alumina ceramic substrate modified by $CaCO_3$ precipitate, exhibit a 66 $m^3 \cdot m^{-2} \cdot h^{-1} \cdot bar^{-1}$ of hydrogen permeable flux and a 3800 of hydrogen permeation selectivity ($H_2/N_2$).

Example 5

Porous substrate surface decoration: γ-AlOOH sol, derived from SB powder, is being as surface pore filler, substrate is alumina porous ceramic tube. Porous substrate was first rinsed with the dilute solution of hydrochloric acid and the dilute solution of sodium hydroxide, and then washed with distilled water, rinsed with $CCl_4$, and then dried. The rinsed alumina porous ceramic tube were immerged in the above Al-sol solution at vacuum condition, AlOOH particles will enter the pore channels and the surface disfigurements of alumina porous ceramic tube under the vacuum conditions. The excess surface pore filler residing on the surface of the support was then removed by mechanical cleaning.

Palladium composite membrane preparation: the procedures are the same as those in example 1.

Post processing method is the same as that in example 1.

Palladium composite membrane, prepared by chemical plating method and porous alumina ceramic substrate modified by γ-AlOOH sol, exhibit a 58 $m^3 \cdot m^{-2} \cdot h^{-1} \cdot bar^{-1}$ of hydrogen permeable flux and a 3800 of hydrogen permeation selectivity ($H_2/N_2$).

Example 6

Colloid preparation: the procedure is the same as those in example 3. Porous substrate surface decoration: the procedure is the same as those in example 3. Palladium-silver alloy composite membrane preparation: First, the procedures are the same as those in example 1. Then, palladium composite membrane obtained is immerged into the chemical plating solution containing silver which component is $AgNO_3$ (9 g/l), sodium citrate (6.5 µl), formaldehyde (37 wt %) (18 ml/l), buffer solution (PH=10) (90 ml/l). Pd—Ag alloy membrane was formed after 4 h calcinations at 450° C. of composite membrane obtained.

Post processing method is the same as that in example 1.

Table 6 lists the hydrogen permeable performances of palladium-silver alloy composite membrane prepared with $Ce(NO_3)_3$ and different precipitators which modified the porous alumina ceramic tube.

TABLE 6

Hydrogen permeable performances of Pd—Ag alloy composite membranes

| Precipitator | Hydrogen flux $M^3 \cdot m^{-2} \cdot h^{-1} \cdot bar^{-1}$ | Hydrogen selectivity $H_2/N_2$ |
|---|---|---|
| $Na_2CO_3$ | 72 | 6900 |
| $K_2CO_3$ | 62 | 5200 |
| $NH_3 \cdot H_2O$ | 53 | 4800 |
| NaOH | 51 | 5800 |
| KOH | 54 | 6200 |

Example 7

For Comparison

Porous substrate surface decoration: porous γ-$Al_2O_3$ is suspended in distilled water, substrate is alumina porous ceramic tube. Porous alumina porous ceramic tube were immerged in the above suspending liquid at vacuum condition, porous γ-$Al_2O_3$ particles will enter the pore channels and the surface disfigurements of alumina porous ceramic tube under the vacuum conditions. Such decorates the substrate. It is the same surface decoration with $CeO_2$, $TiO_2$, and $ZrO2$ instead of γ-$Al_2O_3$.

Palladium composite membrane preparation: the procedures are the same as those in example 1.

Table 7 lists the hydrogen permeability of palladium composite membrane prepared with different pore fillers (γ-$Al_2O_3$, $CeO_2$, $TiO_2$, $ZrO_2$) which modified the porous alumina ceramic tube.

TABLE 7

Hydrogen permeable performances of composite palladium membranes

| Pore fillers | Hydrogen flux $M^3 \cdot m^{-2} \cdot h^{-1} \cdot bar^{-1}$ | Hydrogen selectivity $H_2/N_2$ |
|---|---|---|
| γ-$Al_2O_3$ | 12.8 | 2300 |
| $CeO_2$ | 14.4 | 1800 |
| $TiO_2$ | 13.7 | 1900 |
| $ZrO_2$ | 10.8 | 2400 |

It is seen from table 7 that the conventional γ-$Al_2O_3$, $CeO_2$, $TiO_2$, $ZrO_2$ modified the surface of porous alumina ceramic tube will result in palladium deposit in the channel of γ-$Al_2O_3$, $CeO_2$, $TiO_2$, $ZrO_2$ during membrane formation, and further result the lower hydrogen permeable flux of palladium composite membrane obtained.

Example 8

For Comparison

Porous substrate surface decoration: substrate is porous stainless steel tube. Surface decoration method is the same as that shown in example 7.

Palladium composite membrane preparation: the procedure is the same as that in example 1.

Table 8 lists the hydrogen permeability of palladium composite membrane prepared with different pore fillers (γ-$Al_2O_3$, $CeO_2$, $TiO_2$, $ZrO_2$) which modified the porous stainless steel tube.

TABLE 8

Hydrogen permeable performances of composite palladium membranes

| Pore fillers | Hydrogen flux $M^3 \cdot m^{-2} \cdot h^{-1} \cdot bar^{-1}$ | Hydrogen selectivity $H_2/N_2$ |
|---|---|---|
| γ-$Al_2O_3$ | 6.2 | 3100 |
| $CeO_2$ | 9.8 | 3200 |
| $TiO_2$ | 3.2 | 2200 |
| $ZrO_2$ | 5.1 | 1800 |

It is seen from table 8 that the conventional γ-$Al_2O_3$, $CeO_2$, $TiO_2$, $ZrO_2$ modified the surface of porous stainless steel tube will result in palladium deposit in the channel of γ-$Al_2O_3$, $CeO_2$, $TiO_2$, $ZrO_2$ during membrane formation, and further result the lower hydrogen permeable flux of palladium composite membrane obtained.

The invention claimed is:

1. A process for the preparation of a two layer metal palladium—or palladium alloy—composite membrane consisting of a porous substrate support and a palladium—or palladium alloy—membrane comprising the following consecutive steps:
  1) rinsing/washing and drying the porous substrate support,
  2) treating the porous substrate support with a pore filler in order to decorate the pores of the support and the disfigurements of the substrate surface,
  3) sensitizing and activating with a palladium solution the decorated substrate support,
  4) plating the resulting support with a palladium solution to form the two layer composite membrane,
  5) drying, and
  6) subjecting the resulting composite membrane to a post-processing before or after drying by heating to partly remove or reduce in volume the pore fillers residing in the pore-channels of the porous substrate.

2. A process according to claim 1 wherein step 2 is performed under vacuum by immersing the porous substrate in a solution of pore filler in order to ensure that the pores and the disfigurements of the substrates are preoccupied with the filler and that there is no palladium ingress into the pores during the consecutive preparation steps.

3. A process according to claim 1 wherein in step 3 the porous substrate support is sensitised in $SnCl_2$ solution and activated in $PdCl_2$ solution, respectively.

4. A process according to claim 1 wherein in step 4 the porous substrate is immersed in an electroless plating solution.

5. A process according to claim 4 wherein the electroless plating solution has the composition of [Pd(NH_3)_2]Cl_2, EDTA 2Na, $NH_2$—$NH_2$—$H_2O$, $NH_3H_2O$.

6. A process according to claim 1 wherein the composite membrane is dried and then calcined at least 300° C.

7. A process according to claim 1 wherein the pore fillers used have a particle size lower than 0.2 micron.

8. A process according to claim 1 wherein the surface pore fillers are selected from the group consisting of gels, sols, colloids and precipitates.

9. A process according to claim 8 wherein the pore fillers are selected from the group consisting of Al-sol, Si-sol, Ti-sol, Zr-sol and Ce-sol.

10. A process according to claim 8 wherein the pore fillers are selected from the group consisting of hydroxide-colloid and carbonate colloid.

11. A process according to claim 8 wherein the pore fillers are selected from the group consisting of hydroxide-precipitates and carbonate precipitates.

12. A process according to claim 1 wherein the porous substrate support is selected from the group consisting of porous stainless steel, porous nickel, porous glass and porous ceramics.

13. Process according to claim 1 comprising, after step 2 and before step 3, the step of cleaning the substrate support in order to remove the excess of surface pore filler when an excess of pore filler resides on the substrate support surface.

14. A process according to claim 1 wherein the post-processing includes pyrolysis or calcination of the pore fillers.

15. A process according to claim 7 wherein the pore fillers used have a particle size lower than 0.1 micron.

16. A process according to claim 7 wherein the pore fillers used have a particle size lower than 0.05 micron.

17. A process according to claim 10 wherein the carbonate colloid is an alkali carbonate colloid.

18. A process according to claim 11 wherein the carbonate precipitates are alkali carbonate precipitates.

* * * * *